US012774196B2

(12) United States Patent
Lindén et al.

(10) Patent No.: US 12,774,196 B2
(45) Date of Patent: Oct. 27, 2026

(54) CRANE ASSEMBLY

(71) Applicant: Hiab AB, Malmö (SE)

(72) Inventors: Mats Lindén, Hudiksvall (SE); Peter Gränsmark, Hudiksvall (SE)

(73) Assignee: Hiab AB, Malmö (SE)

( * ) Notice: Subject to any disclaimer, the term of this patent is extended or adjusted under 35 U.S.C. 154(b) by 516 days.

(21) Appl. No.: 18/339,586

(22) Filed: Jun. 22, 2023

(65) Prior Publication Data

US 2023/0416060 A1 Dec. 28, 2023

(30) Foreign Application Priority Data

Jun. 23, 2022 (EP) .................................... 22180763

(51) Int. Cl.

*B66C 23/44* (2006.01)
*B66C 23/00* (2006.01)
*B66C 23/78* (2006.01)

(52) U.S. Cl.

CPC .............. *B66C 23/44* (2013.01); *B66C 23/54* (2013.01); *B66C 23/78* (2013.01)

(58) Field of Classification Search

CPC .......... B66C 23/44; B66C 23/54; B66C 23/78
See application file for complete search history.

(56) References Cited

U.S. PATENT DOCUMENTS

| | | | | |
|---|---|---|---|---|
| 10,086,739 | B2 * | 10/2018 | Yustus | B66C 23/54 |
| 2020/0212680 | A1 * | 7/2020 | Hartl | B66C 23/54 |
| 2021/0269288 | A1 * | 9/2021 | Hatch | B66C 23/40 |

FOREIGN PATENT DOCUMENTS

| | | | |
|---|---|---|---|
| CN | 106915691 | A | 7/2017 |
| DE | 2743373 | A1 | 3/1978 |
| DE | 202016003292 | U1 | 7/2016 |
| JP | 2013075761 | A | 4/2013 |

OTHER PUBLICATIONS

Extended European Search Report for priority European Application No. 22180763.9, mailed Dec. 13, 2022.

* cited by examiner

*Primary Examiner* — Anna M Momper
*Assistant Examiner* — Nathaniel L Adams
(74) *Attorney, Agent, or Firm* — Renner, Otto, Boisselle & Sklar, LLP

(57) ABSTRACT

Crane assembly including a crane base, a column, and a first actuator for rotating the column in relation to the crane base. A crane boom system includes a liftable and lowerable crane boom which is articulately connected to and movable in relation to the column by a second actuator. A support arrangement includes a stabilizer beam and two stabilizer legs, wherein the two stabilizer legs are arranged to be extended from the stabilizer beam and set to ground during operation of the crane boom system to support the stability of the vehicle and crane assembly. A battery arrangement includes a battery cell, and a battery circuitry unit provided with an electrical power take off, and a battery mounting assembly structured to fixedly mount the battery arrangement to the stabilizer beam. The battery arrangement is configured to electrically operate the first actuator and the second actuator via the electrical power take-off.

12 Claims, 4 Drawing Sheets

CRANE ASSEMBLY

This application claims priority of European Patent Application No. 22180763.9 filed Jun. 23, 2022, which is hereby incorporated herein by reference.

TECHNICAL FIELD

The present disclosure relates to a crane assembly which is arranged to be mounted to a vehicle such as a truck. The crane assembly is intended for various applications such as delivering goods, collecting and managing containers for recycling or collecting and managing timber in forestry applications, just to mention a few examples.

Taking the truck as an example of a vehicle, the truck may be electrically powered using a battery or a hydrogen system or powered through e.g. diesel fuel via a combustion engine. The crane assembly that is addressed by the present invention may comprise electrical actuators, hydraulic actuators like hydraulic cylinders or a combination of both types of actuators.

In one exemplary variation, the crane assembly disclosed herein comprises at least one hydraulic actuator powered by a hydraulic system comprising at least one pump which is driven by an electric motor connected to an inverter and a battery system. In another variation the crane assembly comprises at least one electric actuator powered by a battery system. The crane assembly may optionally be connected to the electrical system of the truck in either case. This may be the case both for electrically powered trucks and also for trucks with combustion engines as they may comprise systems for recycling energy during transportation that may be used to charge the battery. Electric power take-off solutions on trucks are provided to power e.g. the hydraulic system of a crane assembly mounted to the truck (like a loader crane, a forestry crane, a hooklift, or another type of demountable equipment).

In known solutions, the battery system is often mounted at a separate location on the truck, and more particularly, to the vehicle frame, where the battery packs may be mounted below the load bed. The battery system may be arranged so that an electrical connection for the charging is accessible at the side of the vehicle.

However, having an extra box with the hardware located on the truck means that space is required for these components on the chassis of the truck where there is also a need to put other components like accessories for the equipment such as a tank for the hydraulic system, the battery system for the vehicle (in case of a battery electric vehicle), and storage space.

Thus, space is limited not only on the truck but also on the crane installation; in particular when the crane is folded in a transport position. It should also be noted that the width of the crane installation, in the longitudinal direction of the truck, should not be increased as this would limit the space available for the load on the truck.

The object of the present invention is to achieve a space-efficient mounting location for a battery arrangement, and in particular a space-efficient mounting location not taking extra space on the frame and/or subframe of the truck required today for truck-related components.

SUMMARY

The above-mentioned objects are achieved by the present invention according to the independent claim.

Preferred embodiments are set forth in the dependent claims.

The crane assembly according to the present invention will achieve a space-efficient, and stable, mounting of the battery arrangement to the crane base, and particularly to the stabilizer beam. Thereby a mounting position of the battery arrangement is provided in a space where it still allows for folding the crane in a transport position.

Further advantages with the technical solution according to the present invention is that it enables the battery arrangement to be an integral part of the crane assembly, and thereby saving space at the truck chassis. Furthermore, the mounting position is such that makes it possible to fold the crane without interfering with the battery arrangement, and it is compatible with today's crane assemblies. Preferably, it will not increase the width of the crane assembly installation on the vehicle.

The technical solution according to the invention addresses a crane assembly comprising a battery arrangement. The battery arrangement comprises at least a battery cell, but may further include additional components of the crane assembly's battery system and optionally also an inverter, motor and/or pump, which are used to power a hydraulic system which may further be part of the crane assembly. The battery arrangement may comprise processing units and logic to manage the battery cell.

The battery arrangement is, according to one embodiment, mounted on a side of the crane assembly where the tip of the second boom is positioned as it is parked and folded, where the battery arrangement may be placed without interfering with the folding of the crane.

In one variation, where the crane assembly is provided with hydraulic actuators and a hydraulic system, the inverter, motor and pump are mounted separately from the battery arrangement. This has the advantage of further distributing the components to save space allocated for the battery and the system efficiency may be further improved by having the motor and pump closer to the tank with hydraulic fluid.

In one the embodiments, the battery arrangement is mounted so that it is supported solely by the stabilizer beam. In this embodiment the battery arrangement may further be placed in an upright position, which may have the advantage of being able to keep control valves and an operator interface for the crane operation positioned to the side of the stabilizer beam, where it is positioned today.

The battery arrangement will not be under the crane boom system when it is parked. If the battery arrangement should have been placed under the crane boom system as parked, the battery arrangement may be damaged from dirt/oil from boom system or if the crane tool or some other component accidently falls from the boom system during maintenance/service/reconfigurations.

In a crane with a limited slew where the slew/rotation of the column is operated by slewing cylinders, the battery arrangement is to be mounted above these slewing cylinders.

For continuous slewing cranes that operate the slewing with a hydraulic motor instead of slewing cylinders, the positioning of the battery arrangement does not need to be adjusted for the slewing cylinders.

In particular, when having a vertical orientation of the battery arrangement, it may be advantageous to define a virtual safety space around the battery arrangement, where the crane parts not are allowed to move.

A protective housing is preferably provided, to protect the battery arrangement, i.e. the battery cells, and e.g. a fan and an inverter. As an alternative, the inverter and fan may be positioned in a separate housing or under a protective cover, close to, e.g. on top of the protective housing of the battery arrangement. This may allow for an even more space efficient solution.

The position of the battery arrangement, when mounted to the crane base, is such that no additional width of the crane assembly is added which is important not to take space from the loadbed. The placement of the battery arrangement is further such that it is placed as far out as possible allowing the crane column to rotate without restrictions, e.g. with the lateral side of the battery arrangement aligned with the end of the slewing cylinder (as far out to the side as possible, without adding space claim) and also aligned with the end surface of the stabilizer beam in the width direction.

DETAILED DESCRIPTION

The crane assembly, and a vehicle comprising the crane assembly, will now be described in detail with references to the appended figures. Throughout the figures the same, or similar, items have the same reference signs. Moreover, the items and the figures are not necessarily to scale, emphasis instead being placed upon illustrating the principles of the invention.

Figure 1:
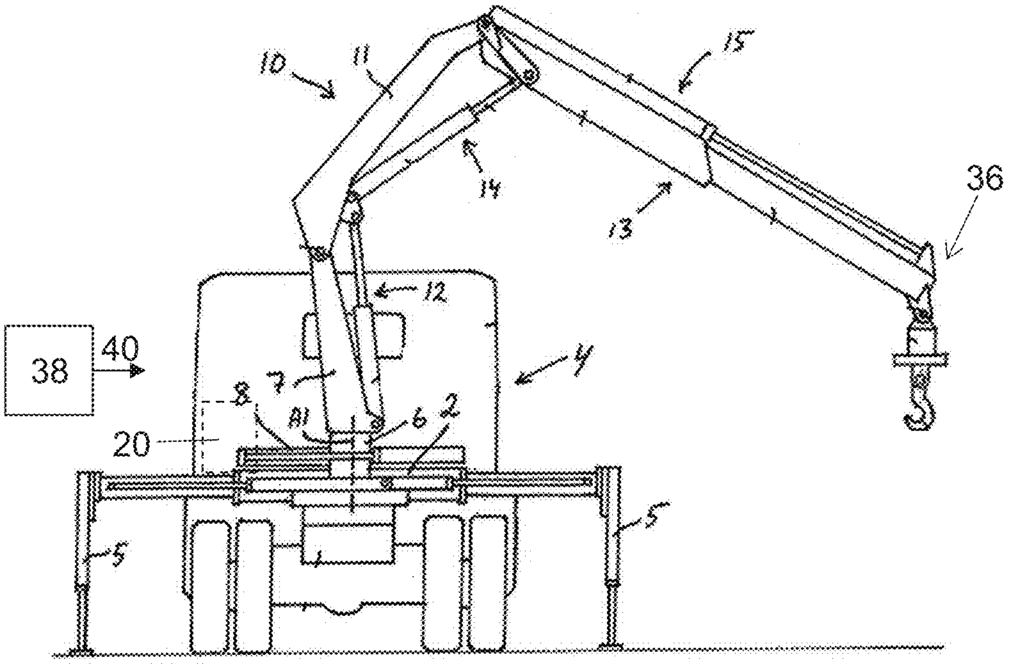
FIG. 1 is a schematic illustration of a basic structure of a crane assembly, mounted on a vehicle, to which the present invention is applicable.

First with references to FIG. 1, which is a schematic illustration of a vehicle from behind provided with a crane assembly according to the present invention. The crane assembly typically comprises a crane base mounted to the vehicle, the crane base comprising a crane slewing house 6. A column 7 is rotatably mounted to the crane slewing house 6 so as to be rotatable in relation to the crane base about an essentially vertical axis of rotation A1 by an actuator 8 for rotating the column 7 in relation to the crane slewing house 6.

Stabilizers 5 and a stabilizer beam 2 are further included in the crane base; the stabilizers may be extended from the stabilizer beam 2 using stabilizer extension booms. The stabilizer beam 2 may be welded, bolted, integrated and/or otherwise connected to the crane slewing house 6 to which the crane column 7 is arranged. The design and manufacturing of the crane base parts could hence be adapted in various way depending on the size and model of the crane.

The crane has further a crane boom system 10 comprising a first and a second liftable and lowerable crane boom 11, 13 which are articulately connected to each other and actuators 12, 14, for lifting and lowering the crane booms 11, 13, wherein a first crane boom 11 of the crane boom system is articulately connected to the column 7, and the second crane boom 13 of the crane boom system is articulately connected to the first crane boom 11. Additional booms, such as telescopic booms (e.g. crane jibs) or fixed booms (e.g. a manual extension boom) may further be added to the crane boom system 10, e.g. a telescopic boom extension may be operated by an actuator 15. The column 7, and the crane boom system 10 together form part of a movable arm of the crane. The end of crane boom 13 is in the illustrated example provided with a crane tip 36 where a hook is arranged.

The actuators 12, 14, 15 of the crane boom system may be arranged to be operated by hydraulic fluid with a hydraulic flow, the hydraulic fluid being discharged from a hydraulic pump at a variable working pressure and wherein the hydraulic actuators are further arranged to apply movements to the movable arm. The actuators 12, 14, 15 may as an alternative be electrically operated actuators. This is also applicable for the actuators operating the slew and actuators for the stabilizer extension and/or legs.

A sensor system is configured to monitor positions of the crane boom system, and operating conditions of the actuators 8, 12, 14, 15 and to generate sensor signals in response to the monitored positions and operating conditions. The sensor system may comprise angle sensors for monitoring the angle of the booms e.g. in relation to the boom or column that they are attached to, sensors for monitoring the slewing angle of the column, pressure sensors measuring the hydraulic pressure in hydraulic cylinders if used as actuators, sensors for measuring how far the boom extensions have been extended, etc.

An equipment control unit 38 is further part of the crane assembly for controlling the actuators 8, 12, 14 of the crane to thereby control the rotation of the column 7 and the positioning of the crane booms 11, 13 on the basis of control signals 40 received over a control interface and the generated sensor signals. The control unit 38 and the control signals 40 are schematically shown in FIG. 1, and the control unit 38 may any processing entity provided with necessary circuitry required to generate the control signal. As an example, it may be an integrated part of a control system of the vehicle or be a separate unit arranged on the crane assembly. Control signals may e.g. be received from a maneuvering unit operated by a crane operator. The crane operator may operate the crane remotely or from the site where the crane performs a working assignment. As an alternative, the equipment control unit may receive control signals at the control interface from an autonomous crane control unit.

Figure 2:
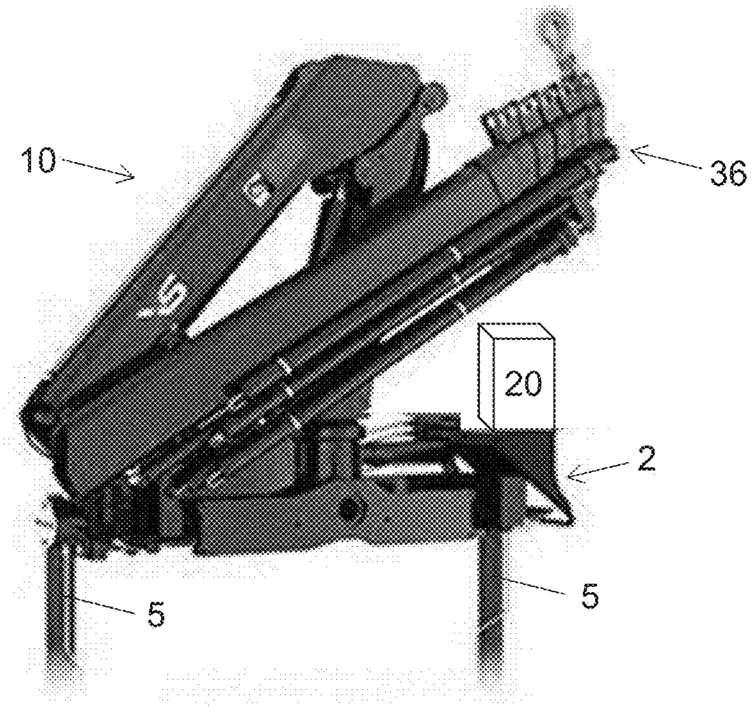
FIG. 2 is a perspective view of a crane assembly according to the present invention.

The crane assembly according to the invention has a predefined parking position in which it is folded and stowed in a space efficient position suitable for transport. The parking position of the crane assembly is illustrated in FIG. 2. In the folded position of the crane assembly, the movable arm is positioned in predefined slewing angle (or within a small slewing sector) pointing towards a side of the vehicle in a direction perpendicular to the longitudinal axis of the vehicle. The second boom is further folded towards the first boom and the first boom is pointing downwards, arranging the crane assembly in a space efficient manner behind the cab of the vehicle. The parking position of the crane assembly is arranged so that it has no crane parts extending beyond the sides of the vehicle cab so that it is prepared for transport. In contrast to the folded position there are further alternatives to transport positions for the crane assembly, the crane movable arm may for example be positioned on the load bed along the longitudinal direction of the vehicle.

Thus, the present invention relates to a crane assembly comprising a crane base arranged to be fixedly mounted to a vehicle, a column 7 which is rotatably mounted to the crane base so as to be rotatable in relation to the crane base about an essentially vertical axis of rotation A1 and a first actuator 8 for rotating the column 7 in relation to the crane base.

The crane assembly further comprises a crane boom system 10 comprising at least one liftable and lowerable crane boom 11, 13 which is articulately connected to the column 7 and movable in relation to the column by at least one second actuator 12, 14.

The crane base comprises a support arrangement comprising a stabilizer beam 2 and two stabilizer legs 5. The two stabilizer legs are arranged to be extended from the stabilizer beam and set to ground during operation of the crane boom system to support the stability of the vehicle and crane assembly.

Generally, the crane base is everything below the attachment point to the crane column including the stabilizer beam and stabilizer legs. Other components that are included in the crane base are e.g. a three-point bridge, connections to the crane column, etc.

More specifically, the three-point bridge is intended to bring down forces to the frame on the vehicle. The articulated construction of the three-point bridge makes the load in the crane slewing house more controllable and less dependent on the rigidity of the vehicle, and simplifies the design of the slewing house. This also means that more load is taken up by frame connecting bolts of the stabilizer beam and less in the three-point bridge. Generally, the three-point bridge is used to attach the crane to the frame of the vehicle.

The crane assembly further comprises a battery arrangement 20 comprising at least one battery cell, and a battery circuitry unit provided with an electrical power take-off, and required circuitry, e.g. inverters and battery management system.

With references to FIGS. 3-7, the crane assembly also comprises a battery mounting assembly 22 structured to fixedly mount the battery arrangement 20 to said crane base.

The battery mounting assembly 22 comprises at least one bracket member 24 adapted to the battery arrangement 20 and provided with first attachment members 26 to attach said battery arrangement 20 to said at least one bracket member 24. The at least one bracket member 24 of the battery mounting assembly 22 is further provided with second attachment members 28 to attach the battery mounting assembly 22 to the stabilizer beam 2. The stabilizer beam is a stable and strong component especially suitable for carrying the battery arrangement, that may have a weight of approximately 200-300 kg.

The battery arrangement 20 is configured to electrically operate the first actuator and the at least one second actuator via the electrical power take-off. Attachment of the battery arrangement to the bracket member is preferably via screws, and attachment of the bracket member to the stabilizer beam is preferably also via screws.

Figure 5:
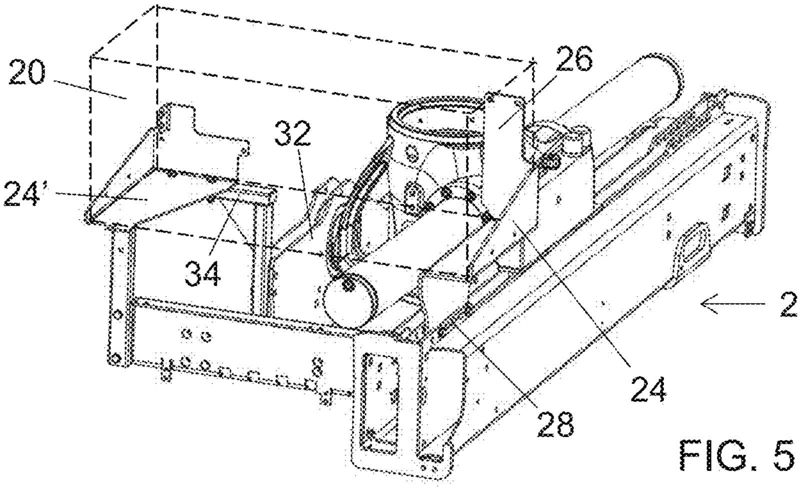
FIG. 5 is a perspective view illustrating another embodiment of the present invention.
Figure 6:
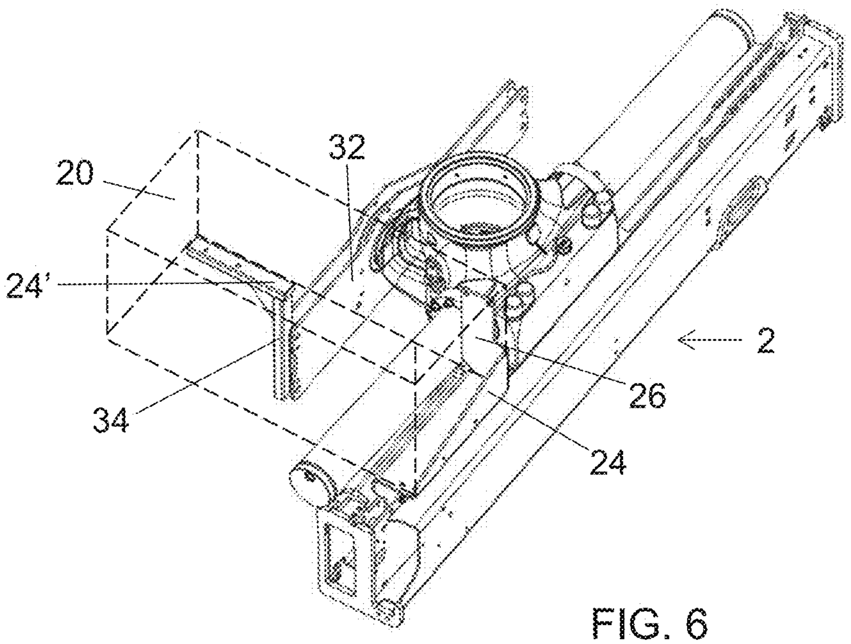
FIG. 6 is another perspective view illustrating the embodiment shown in FIG. 5 of the present invention.
Figure 7:
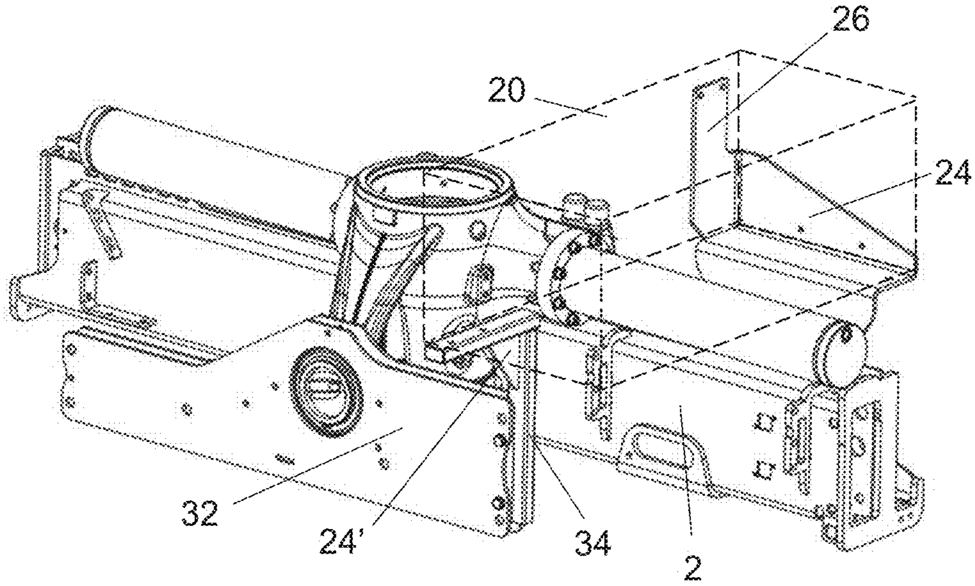
FIG. 7 is still another perspective view illustrating the embodiment shown in FIG. 5 of the present invention.

According to one embodiment, illustrated in FIGS. 5-7, the battery mounting assembly 22 is structured to be mounted on a three-point bridge 32 of the crane base by third attachment members 34 of the at least one bracket member 24, in addition to being attached to the stabilizer beam 2 by the second attachment members 28, such that the battery arrangement 20 is mounted essentially on an upper surface of the three-point bridge 32. In this embodiment, the battery arrangement is mounted with the bracket member 24 to the stabilizer beam and also to a bracket member 24', to the three-point bridge, and the battery arrangement preferably has a horizontal orientation wherein the longitudinal axis of the battery arrangement is arranged to be parallel to the horizontal plane, thereby enabling clearance for the booms when they are in a parked position.

According to another embodiment, the battery mounting assembly 22 is structured such that the battery arrangement 20 is mounted in a vertical/standing orientation wherein the longitudinal axis of the battery arrangement is arranged to be aligned with the vertical direction with regard to its elongated extension. This is illustrated in FIGS. 3 and 4.

According to still another embodiment, the battery mounting assembly 22 is structured such that the battery arrangement 20 is only attached by the second attachment members 28, i.e. the battery arrangement is only attached to the stabilizer beam 2. This embodiment is illustrated in FIGS. 3 and 4.

Figure 3:
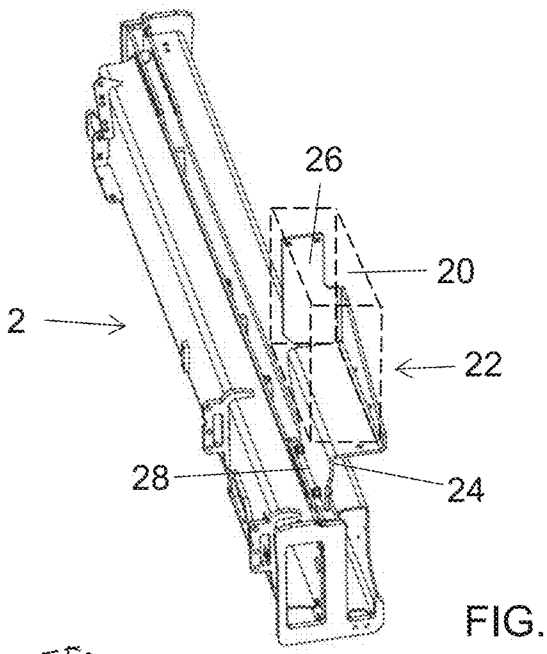
FIG. 3 is a perspective view illustrating an embodiment of the present invention.
Figure 4:
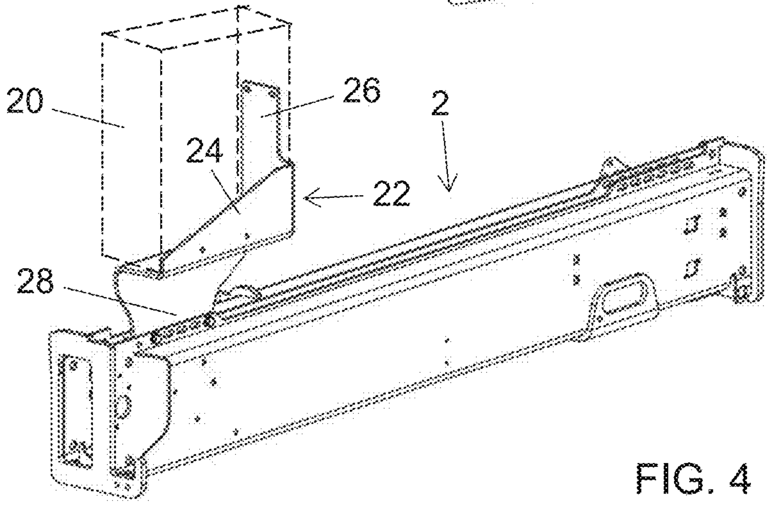
FIG. 4 is another perspective view illustrating the embodiment shown in FIG. 3 of the present invention.

Preferably, and also illustrated in FIGS. 3 and 4, the battery mounting assembly 22 is structured such that the battery arrangement 20 is mounted in a vertical/standing orientation with regard to its elongated extension, and only attached by the second attachment members 28, and thus only attached to the stabilizer beam 2.

In a further embodiment, the at least one bracket member 24 is arranged on the stabilizer beam 2 such that a lateral side of the battery arrangement 20 is aligned with an end of a slewing cylinder and also aligned with a vertical end surface of the stabilizer beam 2, and such that the battery arrangement 20 is fixated on an upper side of the stabilizer beam 2. See in particular FIG. 4.

According to another embodiment, the crane boom system 10 comprises a first crane boom 11 and a second crane boom 13, and wherein the battery mounting assembly 22 is structured to mount the battery arrangement 20 on a side of the crane column 7 where a crane tip 36 of a crane boom is positioned as it is parked and the crane is in a folded position, and without interfering with the crane during a folding procedure of the crane. FIG. 2 illustrates a crane assembly in a folded position.

In another embodiment, the battery arrangement 20 comprises a housing, preferably an elongated housing, e.g. having an elongated box-like shape, enclosing the at least one battery cell, and battery circuitry unit, and provided with mounting members structured to cooperate with the first attachment members to attach the battery arrangement to the at least one bracket member.

According to a further embodiment, the actuators 8, 12, 14 of the crane boom system are arranged to be operated by hydraulic fluid with a hydraulic flow. The hydraulic fluid being discharged from a hydraulic pump at a working pressure, and wherein the hydraulic pump is electrically operated by the battery arrangement via the electrical power take off. In another variation, the actuators 8, 12, 14 of the crane boom system are electrically operated actuators by the battery arrangement 20 via the electrical power take-off.

In another embodiment, the crane assembly comprises a control unit 38 configured to generate control signals 40 capable of controlling the operation of the crane boom system, wherein a three-dimensional virtual space is defined enclosing the battery arrangement 20. Thereby is provided a safety distance, e.g. in the range of 10-50 cm, around the battery arrangement 20, and wherein the control unit 40 is configured to control movements of the crane boom system 10 such that no part of the crane boom system 10 will move into the virtual space.

Figure 8:
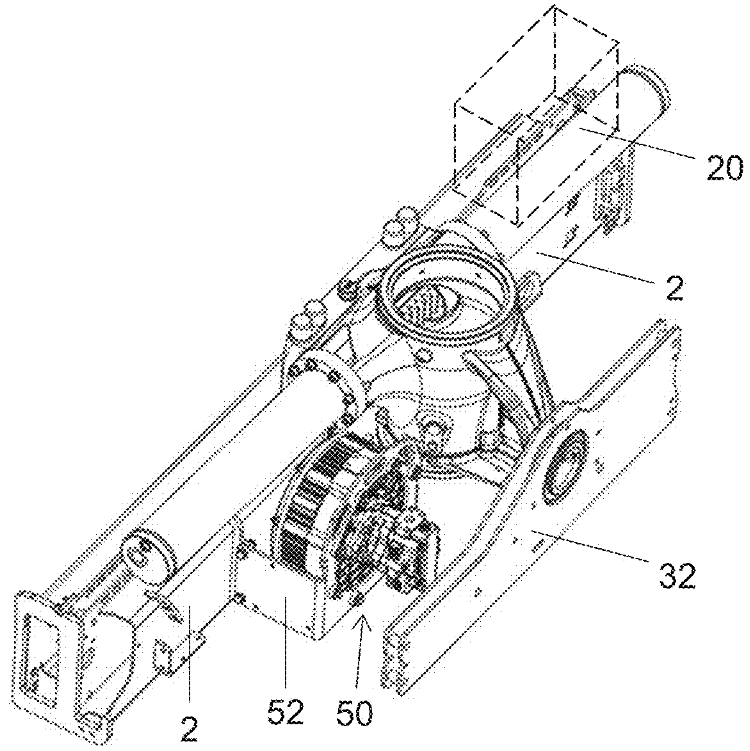
FIG. 8 is a perspective view illustrating a further embodiment of the present invention.

Still another embodiment is provided, which is based upon the further embodiment discussed above, where the actuators 8, 12, 14 of the crane boom system are arranged to be operated by hydraulic fluid with a hydraulic flow, and the hydraulic fluid being discharged from a hydraulic pump at a working pressure, and wherein the hydraulic pump is electrically operated by the battery arrangement via the electrical power take off. In the still another embodiment, which is illustrated by FIG. 8, a combined hydraulic pump end electrical motor assembly 50 is provided, herein denoted combined assembly 50. The electrical motor of the combined assembly is intended be connected to the battery arrangement via the electrical power take-off. In this embodiment, the combined assembly 50 is to be mounted to the stabilizer beam 2 by a fourth attachment member 52. With references to FIG. 8, the larger part of the combined assembly 50, closest to the stabilizer beam 2, is the hydraulic pump, and the smaller part, attached to the hydraulic pump, is the electrical motor. In FIG. 8 the battery arrangement 20 is schematically illustrated. This embodiment comprising mounting the combined assembly 50 to the stabilizer beam 2, is applicable to all other embodiments described herein. In FIG. 8, only reference signs to parts relevant for the illustrated embodiment are shown.

According to a further embodiment, the combined assembly 50 is mounted to one of the vertical surfaces of the stabilizer beam 2 by the fourth attachment member 52. In this embodiment the fourth attachment member 52 comprises a bracket preferably bolted to the vertical surface of the stabilizer beam.

Because combined assembly 50 is located on the vertical surface that faces the three-point bridge 32 (i.e. close to the crane slewing house), it does not take up extra space. The crane assembly will thus take up the same width as before on the truck. In the figure, the combined assembly is mounted on the opposite side of the stabilizer beam in comparison where the battery arrangement is mounted. Since it is mounted at relatively low level, i.e. approximately at the height of the cylinders of the crane slewing house and the stabilizer beam, it will not impede the movements of the crane arm.

A tank for the hydraulic oil may also be provided, which may be mounted to the crane base, but may optionally be mounted at the truck, like for example at the back of the truck cabin. The hydraulic pump should be then mounted at the lower level in comparison to the tank, to get a natural flow towards the pump from the tank.

The combined assembly 50 with the motor and pump may be mounted in connection with battery arrangement 20, as earlier described, either integrated into the battery arrangement, or as separate parts but physically close to each other. This will further add advantages with a more space efficient solution as less space is needed on the vehicle chassis. It is also an advantage for the distribution of the crane assemblies as everything that is needed for the crane is included on the actual crane assembly unit; resulting in less accessory parts to manage for body builders etc. that mount the cranes to the trucks.

The present invention also relates to a vehicle comprising a crane assembly as defined above.

Figure 9:
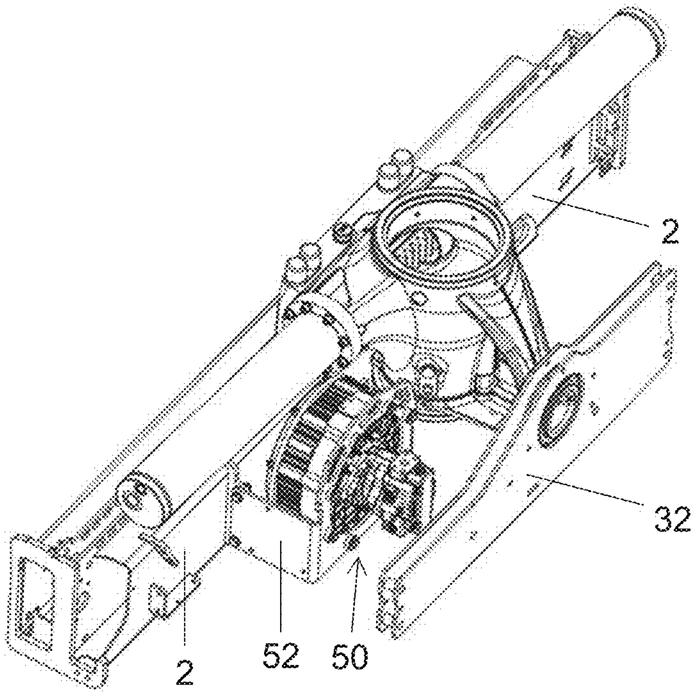
FIG. 9 is a perspective view illustrating a variation of the crane assembly.

A variation of a crane assembly is illustrated in FIG. 9. In this variation no battery arrangement is arranged at the crane assembly, but only a combined hydraulic pump end electrical motor assembly 50, herein denoted combined assembly 50. The electrical motor of the combined assembly is intended be connected to a battery arrangement provided at a vehicle to which the crane assembly is mounted. In this variation, the combined assembly is to be mounted to the stabilizer beam 2 by a fourth attachment member 52. The larger part of the combined assembly 50, closest to the stabilizer beam 2, is the hydraulic pump, and the smaller part, attached to the hydraulic pump, is the electrical motor.

According to a further variation, the combined assembly 50 is mounted to one of the vertical surfaces of the stabilizer beam 2 by the fourth attachment member 52. In this variation the fourth attachment member 52 comprises a bracket, preferably bolted to one of the vertical surfaces of the stabilizer beam.

A tank for the hydraulic oil may also be provided, which may be mounted at the crane base, but optionally may be mounted the at truck, like for example at the back of the truck cabin. The hydraulic pump should be then mounted at the lower level in comparison to the tank, to get a natural flow towards the pump from the tank.

Thus, with references to applicable parts of FIG. 1, and relevant parts of the description above, this variation comprises a crane assembly comprising a crane base arranged to be fixedly mounted to a vehicle, a column 7 which is rotatably mounted to the crane base so as to be rotatable in relation to the crane base about an essentially vertical axis of rotation (A1) and a first actuator 8 for rotating the column 7 in relation to the crane base. The crane assembly further comprises a crane boom system 10 comprising at least one liftable and lowerable crane boom 11, 13 which is articulately connected to the column 7 and movable in relation to said column by at least one second actuator, the crane base comprises a support arrangement comprising a stabilizer beam 2 and two stabilizer legs 5. The two stabilizer legs are arranged to be extended from the stabilizer beam and set to ground during operation of the crane boom system to support the stability of the vehicle and crane assembly. The crane assembly further comprises a combined hydraulic pump and electrical motor assembly 50, wherein the electrical motor of the combined assembly is intended be connected to a battery arrangement arranged at the vehicle, and powered via an electrical power take-off of the battery arrangement, and wherein the combined assembly 50 is mounted to the stabilizer beam 2 by a fourth attachment member 52.

In a further variation, the combined assembly 50 is mounted to one of the vertical surfaces of the stabilizer beam 2 by the fourth attachment member 52.

In the disclosed variation, the combined assembly is mounted at the crane base (preferably at the stabilizer beam)—i.e. taking advantage of a battery system integrated on the vehicle instead. The technical effect of this variation is similar to what have been brought forward for the battery arrangement mounted on the crane base; it is a space efficient solution that allows for more space to batteries at the truck chassis, it also means that the crane assembly covers all the core components without needing to mount extra accessories at the body builder. It also results in that the crane assembly may be plugged into the vehicle's battery arrangement using for example an electrical plug connector to make the installation process easier.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A crane assembly comprising a crane base arranged to be fixedly mounted to a vehicle, a column which is rotatably mounted to the crane base so as to be rotatable in relation to the crane base about an essentially vertical axis of rotation and a first actuator for rotating the column in relation to the crane base, the crane assembly further comprises a crane boom system comprising at least one liftable and lowerable crane boom which is articulately connected to the column and movable in relation to said column by at least one second actuator, the crane base comprises a support arrangement comprising a stabilizer beam and two stabilizer legs, wherein the two stabilizer legs are arranged to be extended from the stabilizer beam and set to ground during operation of the crane boom system to support the stability of the vehicle and crane assembly, wherein said crane assembly further comprises a battery arrangement comprising at least one battery cell, and a battery circuitry unit provided with an electrical power take-off, and a battery mounting assembly structured to fixedly mount said battery arrangement to said crane base, wherein said battery mounting assembly comprises at least one bracket member adapted to the battery arrangement and provided with first attachment members to attach said battery arrangement to said at least one bracket member, wherein said at least one bracket member of the battery mounting assembly is further provided with second attachment members to attach said battery mounting assembly to the stabilizer beam, and wherein said battery arrangement is configured to electrically operate said first actuator and said at least one second actuator via said electrical power take-off, wherein said battery mounting assembly is structured such that said battery arrangement is attached to the stabilizer beam by said second attachment members, wherein said at least one bracket member is arranged on said stabilizer beam such that a lateral side of said battery arrangement is aligned with an end of a slewing cylinder and also aligned with a vertical end surface of said stabilizer beam, and such that said battery arrangement is fixated on an upper side of said stabilizer beam.

2. The crane assembly according to claim 1, wherein said battery mounting assembly is structured to be mounted on a three-point bridge of said crane base by third attachment members of said at least one bracket member, in addition to being attached to the stabilizer beam by said second attachment members, such that the battery arrangement is mounted on an upper surface of said three-point bridge.

3. The crane assembly according to claim 1, wherein said battery mounting assembly is structured such that said battery arrangement is mounted in a vertical/standing orientation with regard to its elongated extension.

4. The crane assembly according to claim 1, wherein said battery mounting assembly is structured such that said battery arrangement is mounted in a vertical/standing orientation with regard to an elongated extension of the battery arrangement, and the battery arrangement is attached to the stabilizer beam by said second attachment members.

5. The crane assembly according to claim 1, wherein said crane boom system comprises a first crane boom and a second crane boom, and wherein said battery mounting assembly is structured to mount said battery arrangement on a side of the crane column where a crane tip of a crane boom is positioned as the crane assembly is parked and the crane is in a folded position, and without interfering with the crane during a folding procedure of the crane.

6. The crane assembly according to claim 1, wherein said battery arrangement comprises a housing enclosing said at least one battery cell, and battery circuitry unit, and provided with mounting members structured to cooperate with said first attachment members to attach said battery arrangement to said at least one bracket member.

7. The crane assembly according to claim 1, wherein said actuators of the crane boom system are arranged to be operated by hydraulic fluid with a hydraulic flow, the hydraulic fluid being discharged from a hydraulic pump at a variable working pressure, and wherein the hydraulic pump is electrically operated by said battery arrangement via said electrical power take-off.

8. The crane assembly according to claim 1, wherein said actuators of the crane boom system are electrically operated actuators by said battery arrangement via said electrical power take-off.

9. The crane assembly according to claim 1, comprising a control unit configured to generate control signals capable of controlling the operation of the crane boom system, wherein a three-dimensional virtual space is defined enclosing said battery arrangement and thereby providing a safety distance around said battery arrangement, and wherein said control unit is configured to control movements of the crane boom system such that no part of the crane boom system will move into said virtual space.

10. The crane assembly according to claim 1, comprising a combined hydraulic pump end electrical motor assembly, wherein the electrical motor of the combined assembly is configured to be connected to the battery arrangement and powered via the electrical power take-off of said battery arrangement, and wherein the combined assembly is mounted to the stabilizer beam by a fourth attachment member.

11. The crane assembly according to claim 10, wherein the combined assembly is mounted to a vertical surface of the stabilizer beam by the fourth attachment member.

12. A vehicle comprising a crane assembly according to claim 1.

* * * * *